3,813,465
CYTOLOGICAL PRESERVATIVE AND
MUCOLYTIC COMPOSITION
Irwin S. Lerner, 341 Shore Road, Greenwich, Conn. 06830, and Joann R. Walla, Fairfax, Conn.; said Walla assignor to said Irwin S. Lerner
No Drawing. Filed Dec. 16, 1971, Ser. No. 208,960
Int. Cl. G01n 1/00, 1/30
U.S. Cl. 424—3      14 Claims

ABSTRACT OF THE DISCLOSURE

Cytological specimens are preserved and the mucus therein is liquefied by treatment with a composition comprising an isotonic lithium chloride solution buffered at a physiologic pH and a cell preserving material such as formalin and thymal.

BACKGROUND OF THE INVENTION

Field of the invention

The invention relates to the preservation of cytological specimens and the liquefication of the mucus in such specimens. The invention also relates to compositions for effecting the above and methods for preparing the compositions.

Prior art

Numerous cytological fixatives utilizing the preservative qualities of formaldehyde and/or thymol are known, e.g., U.S. Pat. 2,554,944. Moreover, many buffer solutions are known.

A saline (NaCl) solution buffered at pH 6.0, and containing a very small amount of formaldehyde is disclosed at page 2063 of "Clinical Laboratory Methods and Diagnosis" by R. B. H. Gradwohl, Fifth ed., The C. V. Mosby Co., 1956. This solution is used for a slide test to determine veneral disease and because of its composition, it will have very little, if any, preservative effect on cells. The formaldehyde in this composition is employed merely to preserve the solution for shelf life.

There have been many approaches to the problem of preserving cells and eliminating the background caused by mucus. For example, digestive enzymes such as trypsin have been used; Pharr et al., Atea Cytological 6, 447–454, September–October 1962. The difficulty encountered when one uses a digestion technique for eliminating mucus is that the enzyme must be prepared fresh and the time during which the specimen is attacked by the enzyme must be controlled in order that the enzymatic action be limited as much as possible to the mucus without disturbing the desired cells. This, of course, results in a compromise since the cells will invariably be attacked at the same time as the mucus. The mucus will be digested faster than the cells and will disappear while the cells will be much less affected.

Other approaches involve the use of preservatives such as alcohol or formaldehyde for the specimen. However, this technique, while adequately preserving the cells, hardens the mucus so that the cells cannot be easily extracted from the specimen. Thus, the problem of the mucus cannot be eliminated by known techniques including enzymatic action, which will not work on the hardened protein of mucus.

The following references describe other approaches to the problems encountered in this area. None of these approaches involves simultaneous mucolytic and preservative action.

Chang et al., Liquefication and Membrane Filtration of Sputum for the Diagnosis of Cancer, The American Journal of Clinical Pathology, Vol. 37, No. 6, pp. 584–592; June 1962;

Collins et al., Preserving Sputum for Examination in the Cytology Laboratory, The American Journal of Clinical Pathology, Vol. 36, No. 1, pp. 92–93; July 1961;

Farber, Clinical Appraisal of Pulmonary Cytology, The Journal of American Medical Assoc., Vol. 175, No. 5, pp. 345–348, February 1961;

Hinson et al., The Diagnosis of Lung Cancer by Examination of Sputum, Thorax 18, pp. 350–353; December 1963;

Lielop et al., Sputum Collection for Cytologic Study, Modern Medicine; Sept. 18, 1961;

Rome et al., Sputum Specimens Versus Bronchial Aspirates in Diagnosis of Bronchogenic Cancer, Journal of American Medical Assoc., Vol. 104, No. 2, pp. 167–169; May 1957;

Takahashi et al., A New Cell Concentration Method for Cancer Cytology of Sputum, Cancer, Vol. 16, pp. 199–204; February 1963; and Tassoni, Sputum Cytology Can Brighten Lung Cancer Prognosis, Journal of American Medical Assoc.; May 18, 1963.

What is desired is a method of collecting cytological specimens, preserving these specimens, and at the same time eliminating the problem of mucus in the finished preparation while keeping to a minimum the effort required by the operator.

Formaldehyde has previously been suggested as a preservative or fixative for use in cytology or tissue preservation. In order for the formaldehyde to be effective, the amount required is much greater than the quantity used in the present invention. The high concentration of formaldehyde used in the known techniques causes the cells and/or the tissue to harden. The formaldehyde also hardens the mucus so that it becomes impossible to remove the cells from the mucus for examination without the visual background disturbance contributed by the mucus. A similar effect occurs when a cytological specimen is collected in alcohol. That is, the specimen is preserved but the mucus becomes hardened, as with the formaldehyde, so that the cells are not readily accessible for examination. The use of formaldehyde in our formulation does provide one of the preservative reagents in the solution, however, with the use of our combination, the mucus is liquefied and the cells are readily obtainable by filtration or centrifugation.

SUMMARY OF THE INVENTION

The present invention provides compositions which are useful in the field of cytology. The compositions of the invention have a dual function. One function is to preserve the cells in a cytological specimen while maintaining the morphology, size and staining characteristics of the cells. The second function is to lyse or liquefy the mucus present in the specimen. It is important to remove the mucus from the specimen, because mucus, which is present in most specimens, hampers the microscopic examination of the cells in the sample and its presence makes cyto-diagnosis quite difficult.

It has now been found that when a fresh cytological specimen containing mucus is treated by agitation with an isotonic solution buffered at a physiologic pH, and containing a preservative, the cells in the specimen are preserved and the mucus is liquefied and rendered readily separable from the cells.

By physiologic pH is meant any pH which corresponds to the normal pH of living cells. Thus, the pH of the composition will vary depending on the type of cells which are to be treated. For example, the pH of most living cells is around 7, but in some instances, will be anywhere from around 5 to 9. The important thing is that the pH of the composition be substantially the same as the pH of the cells under consideration.

Accordingly, in its broadest aspect, the composition of the invention comprises an isotonic solution buffered at a physiologic pH and containing at least one cell preservative.

The isotonic character of the solution is achieved by the use of any salt used conventionally for this purpose. Examples of these salts are lithium, sodium, or potassium chloride, but it is most preferred to use lithium chloride for reasons which will be discussed below.

The solution may be buffered with any combination of buffers conventionally used to achieve a pH in the stated range. It is, however, preferred to use a combination of dibasic sodium phosphate ($Na_2HPO_4$) and monobasic potassium phosphate ($KH_2PO_4$). The pH of the solution is controlled by varying the proportions of the phosphate salts vis a vis one another.

The preservative material which is contained in the solution comprises formaldehyde and thymol, known cell preservatives. A one percent solution of formalin is not by itself completely bacteriostatic, nor is an 0.03 percent solution of thymol. However, the combination of these two preservatives, with the buffer salts and LiCl, provides superior germicidal and bacteriostatic characteristics.

Additionally, the composition may include a minor amount of a dye to mask the unpleasant appearance of many of the cytological specimens which may be treated with the composition.

In a most preferred embodiment, the composition consists essentially of (a) one part of a concentrate consisting essentially of 9 parts of $Na_2HPO_4 \cdot 7H_2O$, 4.5 parts of $KH_2PO_4$, 180 parts of LiCl, 9 parts of thymol and 300 parts of formalin (37% aqueous formaldehyde solution) dissolved in a mixture of 1800 parts of water and 900 parts of absolute ethanol, and (b) 9 parts of water. The pH of this preferred composition is 6.7.

Naturally, the preferred embodiment of the composition may further include minor amounts of the dye described above.

The selection of the pH of the preservative material is limited only in that it should come close to the pH of physiological solutions and materials. That is, it should be close to neutral (pH 7), but can be varied either upward or downward so long as the pH is not drastically different from the pH of the material which is to be preserved. If the pH is different, the cells will be distorted, and depending on the amount of the difference in pH, the cells may in fact be destroyed.

The two phosphate salts are the components selected to determine the pH. Many other combinations are possible. For example: hydroxymethyl - aminomethane (Tris), sodium bicarbonate, propanolamine, potassium chloride, etc.

Other suggested buffers are found in the Handbook of Chemistry and Physics, page D73, 46th edition, 1965, published by the Chemical Rubber Company.

The quantity of lithium chloride used is determined by the need to obtain isotonicity of the final solution. That is, it is desirable to maintain osmotic pressures which are equal to those found in the living cells. Again, this can be obtained using various materials, such as lithium chloride, sodium chloride, or any other alkali or alkaline earth metal chlorides. The amount of the particular salt selected will differ, however, depending on the specific salt chosen.

The choice of lithium chloride over any of the other chlorides such as sodium, potassium, barium, calcium, or magnesium, was made empirically. It was determined that lithium chloride tends to preserve the cell wall structure and decrease the cell wall permeability to other cations. It may be that the lithium ionic radius (being extremely small) acts as a plug in the molecular structure of the cell wall.

In another aspect, the invention is a method for preparing the composition. According to the method, a series of solutions are prepared as set forth below, it being important that the LiCl solution be made fresh immediately before preparing the composition:

(a) 9 gms. $Na_2HPO_4 \cdot 7H_2O$ in 500 cc. of distilled water.
(b) 4.5 gms. $KH_2PO_4$ in 100 cc. of distilled water.
(c) 300 ml. formalin in 200 cc. of distilled water.
(d) 180 gms. LiCl in 1000 cc. of distilled water.
(e) 9 gms. thymol in 900 cc. of absolute ethanol.

Solutions (a), (b) and (c) are mixed. Next, solution (d), still warm from the heat of solution, is added to the mixture with constant stirring, and while continuing the stirring, solution (e) is added. Then, while still continuing the stirring, 1 part of the above mixture is immediately diluted with 9 parts of distilled water. The diluted solution is the composition which is used for preserving the cytological specimen. When it is desired to include a dye in the composition, such dye may be added to any of the solutions in an amount of about 1 gm., or may be added after all the solutions are mixed together. Anyone of many dyes may be used. Examples of such dyes are:

FD & C Red No. 2 (Amaranth); FD & C Yellow No. 5 (Tartrazine); FD & C Red No. 3 (Erytarosine); FD & C Yellow No. 6 (Sunset yellow); and Methylene Blue.

In preparing the composition it is essential that solutions (d) and (e) be added in the given order and that the stirring be continued from the time that the LiCl solution is added until the dilution is completed in order to insure that the several components remain dissolved in the solution.

LiCl is preferred over any other salt for making the solution isotonic because it has been found that when using LiCl, all the components remain in solution, while when using NaCl, some of the components tend to precipitate out when the solutions are mixed. More important, however, is the characteristic effect of the lithium on the cell wall structure, which assists in maintaining long preservation of the sample without complete fixation or hardening.

In still another aspect, the invention is a method of preserving cells in a cytological specimen and liquefying the mucus present therein. According to this method, a fresh cytological specimen is added to the above composition and the resultant mixture is thoroughly mixed, either by hand or mechanically, until the mucus is liquefied. Thereafter, the preserved cells are separated from the liquefied mucus by conventional means, such as filtration, centrifugation or gravity whereby the specimen is suitable for mounting and staining on a microscope slide for examination. The amount of the composition required for proper preservation of the cells and liquefication of the mucus may vary from $\frac{1}{10}$ the volume of the specimen to two or more times the volume depending on the viscosity of the mucus.

The compositions and methods of the invention may be used with optimal results with any fresh and unfixed cytological specimen, including bronchial washings, aspirations and brushings; sinus, trachial, gastric or colonic washings or aspirations; thoracentesis and cystic fluids; urine; sputum; vaginal, cervical, endometrial, cul-de-sac, breast and amniotic fluid aspirations or irrigations; cerebrospinal fluids; and buccal mucosal scrapings.

DESCRIPTION OF THE PREFERRED EMBODIMENTS

The following examples are illustrative of the invention and are not to be considered as limiting the scope thereof.

Example 1

Preparation of cytological preservative and mucolytic composition.

The following solutions are prepared:

(a) 9 gms. of $Na_2HPO_4 \cdot 7H_2O$ in 500 cc. of distilled water;

(b) 4.5 gms. of $KH_2PO_4$ in 100 cc. of distilled water;
(c) 30 ml. of formalin and 1 gm. of FD & C Red No. 2 (Amaranth) in 200 cc. of distilled water;
(d) A freshly prepared solution of 180 gms. of LiCl in 1000 cc. of distilled water; and
(e) 9 gms. of thymol in 900 cc. of absolute ethyl alcohol.

At ambient temperature, solution (a), (b) and (c) are mixed together. While stirring the mixture, solution (d) is added and stirring is continued while solution (e) is added. Still continuing the stirring, 1 part of the above mixture is diluted with 9 parts of distilled water.

Example 2

A 3 cc. specimen of fresh sputum is added to an equal volume of the composition of Example 1 and the mixture is thoroughly mixed by shaking for about one minute until all the visible mucus had liquefied.

Thereafter, the cells contained in the specimen are separated by conventional means and mounted on a slide. After staining the cells by conventional means, the specimen is suitable for microscopic examination.

Having thus described our invention, what we desire to secure by Letters Patent and hereby claim is:

1. A cytological preservative and mucolytic composition comprising an isotonic solution of lithium chloride buffered at a physiologic pH and including formalin and thymol in amounts sufficient to preserve a cytological specimen.

2. A composition as claimed in claim 1, wherein the pH is between about 5 and 9.

3. A composition as claimed in claim 1, wherein the isotonic lithium chloride solution is buffered with dibasic sodium phosphate and monobasic potassium phosphate.

4. A composition as claimed in claim 3, which further comprises a dye.

5. A cytological preservative and mucolytic composition consisting essentially of:
(a) 1 part of a concentrate consisting essentially of 9 parts of $Na_2HPO_4 \cdot 7H_2O$, 4.5 parts of $KH_2PO_4$, 180 parts of LiCl, 9 parts of thymol and 300 parts of formalin dissolved in a mixture of 1800 parts of water and 900 parts of absolute ethanol; and
(b) 9 parts of water based on 1 part of total concentrate.

6. A composition as claimed in claim 5, which further comprises a red dye.

7. A method of preparing the composition as claimed in claim 6, which comprises adding a solution of 9 parts of $Na_2HPO_4 \cdot 7H_2O$ in 500 parts of water to a solution of 4.5 parts of $KH_2PO_4$ in 100 parts of water, adding to the thus obtained mixture a solution of 300 ml. of formalin in 200 parts of water, adding to the resulting mixture, with continuous stirring, a freshly prepared solution of 180 parts of LiCl in 1000 parts of water and a solution of 9 parts of thymol in 900 parts of ethanol to form a concentrate, and, while continuing the stirring, diluting the concentrate with 9 parts of water based on 1 part of total concentrate.

8. A method as claimed in claim 7 comprising adding about 1 part of a dye to any one of the solutions or to the complete composition.

9. A method of preserving a cytological specimen and liquefying mucus contained therein to render said specimen suitable for microscopic examination, said method comprising adding a fresh cytological specimen to about $1/10$ to two times the volume of the composition as claimed in claim 1, mixing the resultant mixture until the mucus contained in the specimen is liquefied and separating the cells from the mixture.

10. A method as claimed in claim 9, wherein the cells are separated from the mixture by filtration, centrifugation, or gravity.

11. A method as claimed in claim 9, which further comprises staining the separated cells and mounting same on a slide for microscopic examination thereof.

12. A method of preserving a cytological specimen and liquefying mucus contained therein to render said specimen suitable for microscopic examination, said method comprising adding a fresh cytological specimen to about $1/10$ to two times the volume of the composition as claimed in claim 1, mixing the resultant mixture until the mucus contained in the specimen is liquefied, and separating the cells from the mixture.

13. A method as claimed in claim 12, wherein the cells are separated from the mixture by filtration, centrifugation, or gravity.

14. A method as claimed in claim 12, which further comprises staining the separated cells and mounting same on a slide for microscopic examination thereof.

References Cited

UNITED STATES PATENTS 2,581,523   1/1952   Ferrari _____ 424—3

OTHER REFERENCES

Wadsworth: Standard Method, N.Y. State Dept. Health (1947), p. 561.

SAM ROSEN, Primary Examiner

UNITED STATES PATENT OFFICE
CERTIFICATE OF CORRECTION

Patent No. 3,813,465  Dated May 28, 1974

Inventor(s) Irwin S. Lerner and Joann R. Walla

It is certified that error appears in the above-identified patent and that said Letters Patent are hereby corrected as shown below:

Column 5, line 2: "(c) 30 ml." should read -- (c) 300 ml. --.

Column 6, line 32: "Claim 1" should read -- Claim 5 --.

Signed and sealed this 1st day of October 1974.

(SEAL)
Attest:

McCOY M. GIBSON JR.
Attesting Officer

C. MARSHALL DANN
Commissioner of Patents